Patented July 16, 1935

2,008,458

UNITED STATES PATENT OFFICE 2,008,458

PROCESS FOR INCREASING THE WETTING-OUT POWER OF ALKALINE LYES

Heinrich Lier, Basel, Switzerland, assignor to the firm of Chemical Works Formerly Sandoz, Basel, Switzerland No Drawing. Application January 3, 1931, Serial No. 506,506. In Germany January 15, 1930

10 Claims. (Cl. 8—20)

I have found that very valuable wetting-out preparations which possess a great efficacy when being used in alkaline solutions like mercerizing lyes can be prepared by mixing phenols, like phenol, cresols, xylenols, chlorophenols or mixtures thereof with nitrogen containing organic bases such as the primary, secondary and tertiary amino-, aminoalkoxy- or quaternary ammonium compounds and their derivatives, containing one or several aliphatic hydroxyl groups; alkyl-, aralkyl- or arylhydrazines and also the heterocyclic bases. Such compounds are for instance benzylamine, aniline, phenyl-trimethylammoniummethylsulphate, triethanol-amine, phentidine, phenylhydrazine, pyrrol, pyridine, quinoline. Instead of the free bases their salts may also be used. The mixtures thus obtained are more or less colored solutions easily soluble in alkaline solutions, but almost insoluble in water.

When added to alkaline lyes, these mixtures impart to them very durable wetting-out properties, which are not affected by the temperatures generally used in mercerizing processes. In order to obtain the desired effect, the above described mixtures are added in suitable quantities to the alkaline lyes of various concentrations or the mixtures are generated therein by adding their constituents under good stirring.

According to the present invention it is possible to mercerize dry raw sized cotton fibres very rapidly and to obtain a very high lustre in a single treatment.

The present invention could in so far not be foreseen as compounds like aniline, pyridine bases, hydrazine, when used in small quantities, have no wetting action, especially in such concentrated alkaline lyes that are used in the present process, where they are nearly insoluble. Nor the phenols alone, nor the organic bases alone are capable to impart to the alkaline lyes such wetting power as it can be obtained with mixtures of these bodies together.

The following examples, without being limitative, illustrate the new process, the parts being by weight:

Example 1

An excellent wetting-out preparation can be prepared by mixing 90 parts of technical tarcresol mixture with 10 parts of aniline. When added to a caustic soda solution of about 32° Bé., the new preparation increases its wetting-out properties in such a way that it immediately impregnates raw dry cotton tissues.

Example 2

A piece of raw dry cotton tissue is treated on a mercerizing machine with a caustic soda solution of 35° Bé. containing 1,14 per cent of a mixture consisting of 80% of technical cresol mixture and of 20% of triethanol-amine, and after the alkaline treatment washed and finished in the usual way. The thus obtained tissue is very uniformly mercerized and possesses an excellent lustre.

Example 3

To 100 parts of a caustic soda solution of 25° Bé. are added 2 parts of a mixture consisting of 85% of technical tar cresol mixture and of 15% of phenyltrimethylammonium-methylsulphate of the formula:

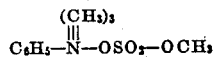

The wetting-out action of the solution thus obtained is so great that raw dry cotton tissues and yarns are immediately impregnated and shrink very rapidly.

Example 4

To 100 parts of a caustic soda solution of 20° Bé. are added 1,3 parts of a mixture consisting of 70% of technical tar cresol mixture and 30% of pyridine. The solution thus obtained possesses very strong wetting-out properties and impregnates immediately tissues composed of cellulosic or animal fibres.

What I claim is:—

1. A process for markedly increasing the wetting-out power of alkaline lyes consisting in adding phenols and non-acylated nitrogen-containing organic bases to said alkaline lyes.

2. A process for markedly increasing the wetting-out power of alkaline lyes consisting in adding admixtures of phenols and non-acylated nitrogen-containing organic bases to said alkaline lyes.

3. A process for markedly increasing the wetting-out power of mercerizing caustic soda lyes, consisting in adding to the latter a mixture consisting of about 90 parts of technical cresol mixture and about 10 parts of aniline.

4. A process for markedly increasing the wetting-out power of mercerizing caustic soda lyes, consisting in adding to the latter a mixture consisting of about 80% technical cresol mixture and about 20% triethanolamine.

5. A process for markedly increasing the wetting-out power of mercerizing caustic soda lyes, consisting in adding to the latter a mixture consisting of about 70% technical cresol mixture and about 30% pyridine.

6. A process for markedly treating cellulosic fibers with alkali, consisting in submitting said fibers to the action of an alkaline lye containing phenol and non-acylated nitrogen-containing organic base.

7. Alkaline lyes of enhanced wetting-out power, containing phenol and non-acylated nitrogen-containing organic base.

8. As wetting agent for use in alkaline lyes the mixture consisting of about 90 parts of technical cresol mixture and of about 10 parts of aniline.

9. As wetting agent for use in alkaline lyes the mixture consisting of about 80 parts of technical cresol mixture and of about 20 parts of triethanolamine.

10. As wetting agent for use in alkaline lyes the mixture consisting of about 70 parts of technical cresol mixture and of about 30 parts of pyridine.

HEINRICH LIER.